United States Patent Office 2,891,951
Patented June 23, 1959

2,891,951

SUBSTITUTED SULFONYL Fe-NITROSO-β-NAPHTHOL DYES

Albert F. Strobel, Albany, and William W. Williams, New York, N.Y., assignors to General Aniline & Film Corporation, New York, N.Y., a corporation of Delaware No Drawing. Application February 17, 1956
Serial No. 566,097

5 Claims. (Cl. 260—242)

This invention relates to a new class of sulfonamide Fe-nitroso-β-naphthol dyes.

Fe-nitroso-β-naphthol dyes containing a sodium sulfonate, a sulfonic acid or a sulfamyl radical as a substituent in the naphthol ring are well known. They have not been commercially utilized because of several inherent shortcomings. For example, they yield dyes on wool and nylon of distinctly duller shade and lose considerable color strength after several washings.

We have discovered that the foregoing shortcomings can be readily overcome by providing dyes which contain in the sixth position of the naphthol ring an alkylsulfonyl, dialkylsulfamyl, or morpholinosulfonyl radical. Such dyes have excellent wash fastness, have much better neutral dyeing affinity for wool and nylon, and yield dyeings of distinctly brighter shades. Such dyes are characterized by the following general formula:

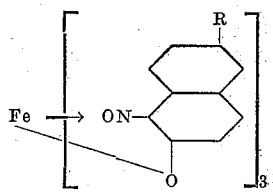

wherein R represents a methylsulfonyl, —SO$_2$CH$_3$, a dimethylsulfamyl, —SO$_2$N(CH$_3$)$_2$, or a morpholinosulfonyl, —SO$_2$—N=(CH$_2$CH$_2$)$_2$=O, radical.

The dyes characterized by the above formula are prepared by first condensing 2-naphthol-6-sulfonic acid with benzene sulfonyl chloride to yield the corresponding benzene sulfonyl ester. The latter is treated with phosphorous trichloride to yield the benzenesulfonyl ester of 2-naphthol-6-sulfonyl chloride which is condensed with dimethylamine, morpholine, etc., to give benzenesulfonyl ester of 2-naphthol-6-N,N-dimethylsulfonamide, benzenesulfonyl ester of 2-naphthol-6-sulfone morpholide, etc. The resulting substituted sulfonamide is then subjected to hydrolysis, nitrosation and iron complex formation by the established procedure. Further details regarding the several procedural steps involved in the process will become clearly manifest by reference to the following working examples:

Example I

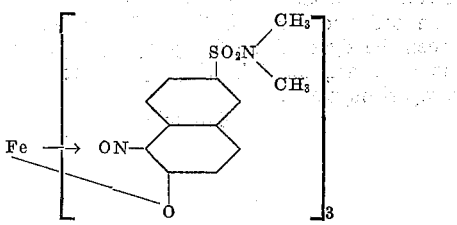

Into an 8-liter battery jar was charged 5,000 ml. of water, 655 grams of 2-naphthol-6-sulfonic acid and 366 grams of anhydrous sodium carbonate. The material was heated to 60° C. and 476 grams of benzenesulfonyl chloride added slowly. The reaction mixture was stirred vigorously during this addition for one-half hour after the addition was completed. The test for free naphthol became very faint (p-toluidine diazo). The reaction mixture was allowed to cool overnight to room temperature, and the filtered cake washed with 500 ml. of water and dried at 80° C. The material after drying, which amounted to 1065 grams, was hammermilled to yield the benzenesulfonyl ester of 2-naphthol-6-sodium sulfonate.

Into a 3-liter flask equipped with a stirrer, condenser (with hydrogen chloride trap) and thermometer was charged 2000 grams of phosphorous trichloride. The charge was warmed to 60° C. and 1053 grams of the benzenesulfonyl ester of 2-naphthol-6-sodium sulfonate was added slowly over a period of 45 minutes. The reaction mixture was stirred for 7 hours at reflux and then allowed to stand overnight. It was reheated to 70° C. and then poured slowly and in a thin stream into ice-water slush. Ice was added to keep the temperature below 5° C. The total drowning volume was equivalent to about 12 liters. The slurry was stirred for one-half hour and then filtered. The filter cake was slurried in two liters of ice-water and refiltered. The presscake after drying yielded 500 grams of dry product in the form of the benzenesulfonyl ester of 2-naphthol-6-sulfonyl chloride.

Into a 4-liter beaker was charged 750 ml. of ice-water slush and 594 grams of dimethylamine (25% aqueous solution equivalent to 3.3 moles 100%) at 0–9° C. 603 grams of the above dry presscake was added in portions over a period of 10 minutes. The charge was stirred for 2 hours at 10° C. and then the stirring continued overnight while allowing the temperature to rise to room temperature. The charge then was stirred for 3 hours at 60° C. on the steam bath. It was cooled to 30° C. and filtered, and the filter cake washed with 500 ml. of 10% aqueous salt solution to yield 586 grams of wet cake.

Into a 5-liter flask equipped with thermometer, stirrer, and reflux condenser was charged 2500 ml. of water. To it was added slowly 300 grams of sodium peroxide pellets. When dissolved the solution was heated to 87° C. Then over a period of 10 minutes, 586 grams of the cake, benzenesulfonyl ester of 2-naphthol-6-N,N-dimethyl sulfonamide, was added. The charge was then heated to reflux and stirred for 2 hours while at reflux. The reaction mixture was allowed to stand overnight and then heated to 85° C. and filtered while hot. The filtrate was charged into an 8-liter battery jar (cooled in an ice bath) and to it was added 225 ml. of concentrated sulfuric acid dropwise while stirring. The temperature dropped from 60° C. to 30° C. The slurry was then cooled at 17–23° C. for 10 minutes, and the filter cake was washed on the funnel with 1500 ml. of cold water. The yield of the wet cake amounted to 244 grams. It was dried at 65° C. to yield 175 grams of 2-naphthol-6-N,N-dimethyl sulfonamide.

25.1 grams equivalent to 0.1 mole of the benzenesulfonyl ester of 2-naphthol-6-N,N-dimethyl sulfonamide, having a molecular weight of 251, was dissolved in 300 cc. of water and 26 cc. of 40% weight by volume of aqueous sodium hydroxide by heating to 40–45° C. The pH of the solution was 12.6. To the solution was then added 23 cc. of 30% sodium nitrite while cooling externally in an ice bath at about 20° C. To the reaction mixture 93 cc. of 20% sulfuric acid was dripped in. After the dripping of the acid the material became tarry. 100 cc. of ethanol was added to the tar and worked with a glass rod until dissolved and then the reaction mixture cooled to 20° C. After one-half hour of stirring 1 cc. of 30% sodium nitrite was added. The reaction gave a positive test of m-nitroaniline diazo. After 45 minutes of stirring 1 cc. of 30% sodium nitrite was added, and the mixture stirred overnight at room temperature. During this time the reaction became darker in color, and the test with potassium iodide starch paper showed no excess of nitrite. The cake was filtered, washed with 500 cc. of water and sucked down sharp. It was then dried in a vacuum oven at 70-75° C. to yield 19.8 grams of the nitrosation product.

19.6 grams of the nitrosation product equivalent to 0.07 mole and having a molecular weight of 280 was slurried with 280 ml. of ethanol. To the slurry was added 6.3 grams of commercial ferric chloride. The mixture was then refluxed (77-78° C.) for 90 minutes on a steam bath and then cooled to 40° C. and poured into 560 ml. of water while stirring for 15 minutes. It was then filtered and the presscake washed with 350 ml. of hot water. The last 100 ml. of washing showed negative test for iron with sodium sulfite. The presscake was dried at 70-75° C. in a vacuum oven to yield 11.8 grams of the Fe complex.

The resulting Fe complex green dye was dispersed by kneading the dye in a Werner-Pfleiderer mixer with an equal weight of the formaldehyde condensation product of naphthalene-2-sodium sulfonate.

This dispersed iron complex was applied to wool and nylon from a neutral aqueous dyebath at 170° F. with essentially complete exhaust of the dyebath. A distinct bright grass green shade was obtained with excellent light and wash fastness.

*Example II*

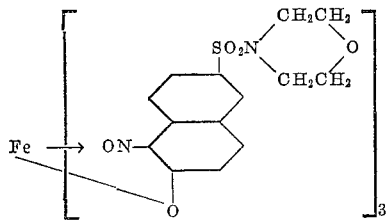

Example I was repeated with the exception that the dimethylamine was replaced by an equimolar amount of morpholine.

The nitrosation is carried out in the same manner as the nitrosation of the 2-naphthol-6-N,N-dimethylsulfonamide of Example I using equimolecular amounts of 2-naphthol-6-morpholinyl sulfonamide in place of the 2-naphthol-6-N,N-dimethylsulfonamide.

The Fe complex formation was carried out in the same manner as in Example I using equimolecular amounts of 1-nitroso-2-hydroxy-6-N-morpholinyl-sulfonamide in place of 1-nitroso-2-hydroxy-6-N,N-dimethylsulfonamide. The resulting dye is dispersed in a Werner-Pfleiderer mixer using 50% by weight of the formaldehyde condensation product of naphthalene-2-sodium sulfonate.

Fastness to washing of the resulting dye on wool and nylon was excellent. The dyeing was of a distinct bright grass green shade.

*Example III*

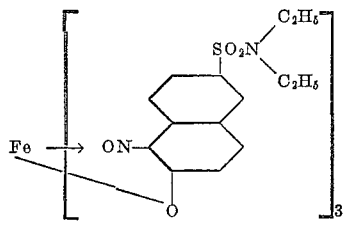

Example I was again repeated with the exception that the dimethylamine was replaced by an equimolar amount of diethylamine.

*Example IV*

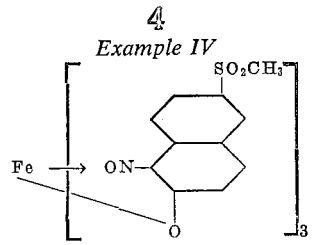

Into a 5 liter flask was charged 1000 cc. of water at 40° C. and 328 grams of anhydrous sodium sulfite added. After stirring 15 minutes 1500 cc. of ice water was added and the flask cooled in an ice bath to 20° C. At this point 645 grams of benzenesulfonyl ester of 2-naphthol-6-sulfonyl chloride prepared in accordance with Example I was added. To the reaction mixture was added slowly 612 cc. of 10% aqueous weight by volume of sodium hydroxide while keeping the reaction always slightly alkaline to a brilliant yellow paper. The volume of the reaction mixture totaled 3600 ml. to which was added 500 cc. of 50% sulfuric acid and 300 grams of salt. The slurry was stirred for 3 hours at 8° C. and filtered to yield 305 grams of wet cake. The cake was slurried in 500 cc. of warm water (50° C.) and 230 cc. of 20% weight by volume aqueous sodium carbonate to bring the pH to 7. The solution was evaporated to dryness while stirring in a beaker over a Bunsen burner. The material was broken in a mortar into small pieces and dried overnight in a vacuum oven at about 80° C. to yield 300 grams of the sodium sulfinate derivative.

Into a 1-liter flask equipped with condenser, stirrer and thermometer was charged 350 cc. of absolute alcohol, 300 grams of the above sulfonate and 124 grams of methyl iodide. The mixture was heated to reflux. Within 1 hour the reflux temperature rose from 59-75° C. The reaction mixture was then heated at reflux for 3 hours, allowed to cool to 55° C. and poured into 1000 cc. of water. After stirring 1 hour the material was separated by suction. The filter cake was washed on the funnel with 500 cc. of water to yield 327 grams of wet cake which was dried at 60° C. to yield 180 grams of dry weight material.

The hydrolysis of the resulting benzenesulfonyl ester to the free naphthol was conducted in the following manner:

Into a 2-liter four-necked flask equipped with a stirrer, condenser and thermometer was charged 600 cc. of water and 80 grams of sodium hydroxide pellets. When dissolved 150 grams of the benzenesulfonyl ester of 6-methylsulfonyl-2-naphthol was added and the reaction mixture refluxed for 3 hours at 102-103° C. The contents of the reaction flask were filtered hot, and the filtrate transferred to a 1500 ml. beaker and acidified (blue to Congo paper) with 255 cc. of 18% aqueous hydrochloric acid. The slurry was cooled to 10° C. for ½ hour and filtered. The filter cake was washed on the funnel with 600 cc. of water and dried at 61° C. to yield 110 grams of 6-methylsulfonyl-2-naphthol which was dispersed to the Fe complex. The resulting Fe complex was dispersed with an equal weight of the formaldehyde condensation product of naphthalene-2-sodium sulfonate as in Example I. The resulting dye had the identical dyeing characteristics on wool and nylon as in Example I.

In order to establish the difference in properties between the dyes of the foregoing examples and those of the prior art, the following dyes were prepared and a comparison made.

*Example V*

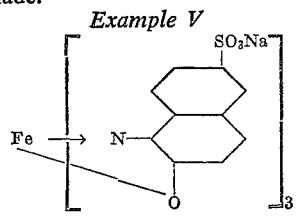

The above dye was prepared in accordance with teachings of United States Patent 316,036.

*Example VI*

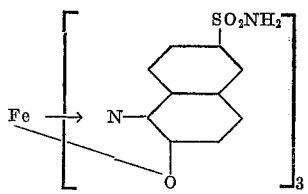

type

This dye was prepared in accordance with the disclosure in P.B. report 85172, page 123.

A separate dye bath for each of the dyes of Examples I to VI inclusive was prepared. Each bath contained 300 ml. of water, 0.3 gram of ammonium sulfate, and 0.2 gram of the dye which had been previously dispersed with an equal weight of formaldehyde-naphthalene-2-sodium sulfonate. 2% dyeings were made by adding 10 grams of wool cloth to each dye bath. Each dye bath was gradually brought to the boil over a ¾ hour period and heating at the boil with agitation of the wool cloth for 1 hour, then rinsing the dyed cloth and drying.

Part of the dyed cloth in each case, 1 to 6, was subjected to 3 successive washings by AATCC wash test No. 3. The dyeing of Examples V and VI each lost about ⅔ of its color strength in these washings. The washed samples of each of the dyeings of Examples I to IV inclusive lost about ⅓ of their respective colors in this wash test. From these tests, it became clearly evident that the dyes of Examples I to IV are about twice as fast to washing as the dyes of Examples V and VI. In other words there is a 33% loss versus 66% loss or 67% retention versus 34% retention. The dyes of Examples I to IV exhibited better neutral dyeing affinity for wool and yielded dyeings of distinctly brighter shades than the dyes of Examples V and VI.

We claim:

1. Fe-nitroso-β-naphthol dye having the following formula:

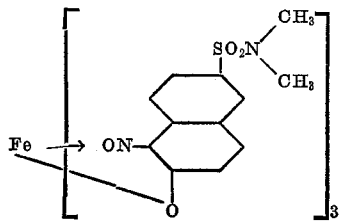

2. Fe-nitroso-β-naphthol dye having the following formula:

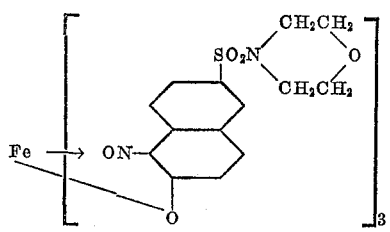

3. Fe-nitroso-β-naphthol dye having the following formula:

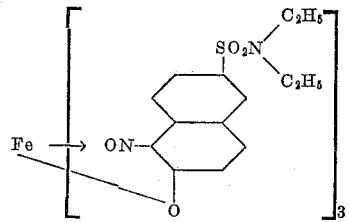

4. Fe-nitroso-β-naphthol dye having the following formula:

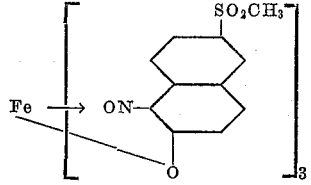

5. Fe-nitroso-β-naphthol dyes having the following formula:

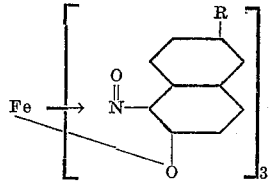

wherein R represents a member selected from the group consisting of lower alkyl sulfonyl, dimethylsulfamyl, diethylsulfamyl and morpholinosulfonyl radicals.

References Cited in the file of this patent

UNITED STATES PATENTS

| | | |
|---|---|---|
| 316,036 | Hoffman | Apr. 21, 1885 |
| 2,095,077 | Payne | Oct. 6, 1937 |

OTHER REFERENCES

Publication Board Report number 85,172, page 123.